United States Patent [19]
Tomita

[11] 3,798,023
[45] Mar. 19, 1974

[54] METHOD FOR PRODUCING TUNGSTEN WHISKERS

[76] Inventor: Chuji Tomita, 1507-Kamisuwa, Suwa-shi, Japan

[22] Filed: May 3, 1972

[21] Appl. No.: 249,973

Related U.S. Application Data

[63] Continuation-in-part of Ser. No. 37,996, May 18, 1970, abandoned.

[30] Foreign Application Priority Data

May 23, 1969  Japan................................ 44-39745
Sept. 11, 1969  Japan................................ 44-71636

[52] U.S. Cl....................... 75/.5 BB, 148/1.6, 75/84
[51] Int. Cl................................................. B22f 1/00
[58] Field of Search...................... 75/.5 BB; 148/1.6

[56] References Cited
UNITED STATES PATENTS

| | | | |
|---|---|---|---|
| 2,763,541 | 9/1956 | Mettler............................. | 75/.5 BB |
| 2,836,524 | 5/1958 | Brenner et al....................... | 148/1.6 |
| 2,842,468 | 7/1958 | Brenner............................ | 148/1.6 |
| 2,842,469 | 7/1958 | Fullman et al...................... | 148/1.6 |
| 3,060,013 | 10/1962 | Harvey............................ | 148/1.6 X |
| 3,063,866 | 11/1962 | Mayer et al....................... | 148/1.6 X |
| 3,177,067 | 4/1965 | Nichols........................... | 75/.5 BB X |
| 3,539,335 | 11/1970 | Svanstrom......................... | 75/.5 BB |

*Primary Examiner*—G. T. Ozaki
*Attorney, Agent, or Firm*—Blum, Moscovitz, Friedman & Kaplan

[57] ABSTRACT

Tungsten whiskers ranging in diameter from about 0.5 to 3 $\mu$ are produced by interdispersing tungsten oxide and a suitable catalyst in fine granular form and heating the interdispersion in a hydrogen atmosphere.

7 Claims, 1 Drawing Figure

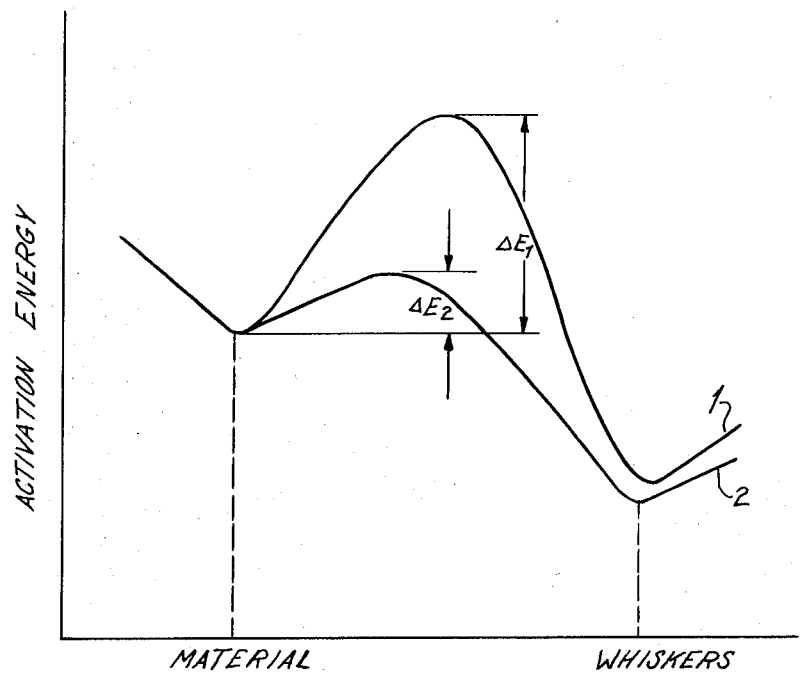

METHOD FOR PRODUCING TUNGSTEN WHISKERS

CROSS-REFERENCE TO RELATED APPLICATION

This application is a continuation-in-part application of my co-pending application having the Ser. No. 37,996, filed May 18, 1970 now abandoned.

BACKGROUND OF THE INVENTION

Whiskers of various types including metals and carbon have received considerable attention, largely because of the fact that they exhibit strengths which are close to the theoretical as based on the strength of bonds between individual atoms. Although a number of types of whiskers or filaments are already marketed commercially, the prices of such whiskers are extremely high due to the difficulty of producing them in quantity. Moreover, with respect to certain types of whiskers, reliable methods of producing whiskers substantially uniform in strength, diameter and length have not been available.

SUMMARY OF THE INVENTION

Tungsten whiskers are produced by interdispersing tungsten oxide and a catalyst, placing the resultant interdispersion in a hydrogen atmosphere and raising the temperature to between about 950° and 1,100° C. The catalyst particles should range in size from about 1/200 microns to about 5 microns. The catalyst content should range from about $1 \times 10^{-3}$ to about 2 atomic percent of the total weight of the interdispersion. Suitable catalysts are nickel, palladium, platinum and their halides.

Vapor-liquid-solid methods have been used for preparation of whiskers. However, it has been found difficult to control the size and number of whiskers produced. As is evident, factors such as temperature, particle size and shape, atmosphere and impurities affect the quality of the product. Seeds having the composition of the desired whiskers have been added as catalyst and control the growth of whiskers epitaxially but not chemically.

Accordingly, an object of the present invention is to provide an improved method of preparing tungsten whiskers.

Another object of the present invention is to provide an improved method of preparing tungsten whiskers in high yield and at relatively low cost.

A further object of the present invention is to provide an improved method of preparing tungsten whiskers ranging in diameter from about 0.5 micron to about 3 microns and in length from about 20 microns to about 300 microns.

Still another object of the present invention is to provide an improved method of producing whiskers wherein a catalyst is used for its chemical effect upon the origination and growth of whiskers.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE illustrates the effect of a catalyst on the activation energy necessary for production of whiskers and thereby on the rate of formation of whiskers.

DESCRIPTION OF THE PREFERRED EMBODIMENTS

The process of the present invention depends on the use of suitable catalysts for the growth of tungsten whiskers rather than on the use of seeds common in the prior art. The method by which a catalyst is effective is illustrated in the single FIGURE which is a potential energy diagram showing the activation energy required for a chemical reaction in the absence of and in the presence of a catalyst. Curve 1 corresponds to a reaction in the absence of a catalyst; the height of the energy barrier is $\Delta E_1$. In the presence of an effective catalyst, however, the reaction curve is that labelled 2. Here the energy barrier is $\Delta E_2$, which, as can be seen, is substantially lower than the energy barrier for the uncatalyzed reaction. As a result, the fraction of molecules having the requisite energy to pass over the barrier is much greater in the presence of the catalyst than in the absence of the catalyst which, in turn, results in the catalyzed reaction being much more rapid than the uncatalyzed reaction.

The quantity of catalyst which should be added has been found to lie between fairly definite limits. Where the quantity of catalyst is less than about $1 \times 10^{-3}$ percent of the tungsten oxide which serves as the raw material for the tungsten whiskers, the reaction rate is inconveniently low. Conversely, when the catalyst content is greater than about 5 atomic percent, saturation is reached, i.e., no further increase in growth rate occurs.

The size of the catalyst particles is also significant. In general, the catalyst particles should range in size between 1/200 microns and 3 microns.

The process steps are as follows:

1. Fine granular tungsten oxide and catalyst particles are interdispersed as by rolling in a tube or by mechanically mixing.
2. The interdispersion thus produced is placed in a hydrogen atmosphere.
3. The temperature is raised to between 950° and 1,100° C.
4. The interdispersion is maintained within this temperature range until the desired growth of whiskers has occurred.

Although a stationary hydrogen atmosphere may be used if the volume thereof in relation to the quantity of tungsten oxide being treated is sufficiently large, it is preferable to pass the hydrogen over the interdispersion in order to carry off the water and hydrogen halides which may be produced. Suitable rates of transfer of the hydrogen across the interdispersion lie between 100 and 1,000 liters/hour for a 500 gram batch. As is obvious, the rate at which hydrogen should be passed over the interdispersion is roughly proportional to the size of the interdispersion batch.

The following examples illustrate the process.

EXAMPLE 1

| Raw materials | Grams Used |
|---|---|
| $WO_3$ | 500 |
| $NiCl_2$ (as the catalyzer) | 0.5 |

The interdispersion was carried out by mechanically mixing the granules of the two materials. The rate of flow of hydrogen gas was 300 liters per hour and the temperature was held at 1,000° C. About 350 grams of whiskers varying in diameter from 0.5 to 1 micron and in length from 20 to 200 microns were produced.

EXAMPLE 2

| Raw materials | Grams Used |
|---|---|
| $WO_3$ | 500 |
| $PdCl_2$ (as the catalyzer) | 0.5 |

The mixture of $WO_3$ and $PdCl_2$ was interdispersed as described above and the compounds were reduced at a temperature of 1,000° C by hydrogen gas flowing at a rate of 300 liters per hour. About 350 grams of tungsten whiskers varying in diameter from 1 to 1.5 microns and in length from 20 to 300 microns were obtained.

EXAMPLE 3

| Raw materials | Grams Used |
|---|---|
| $WO_3$ | 500 |
| Pt powder (as the catalyzer) | 0.5 |

The interdispersion of $WO_3$ and Pt was produced as above. The reaction was carried out at 1,000° C, and tungsten whiskers varyin diameter from 1 to 3 microns and in length from 20 to 100 microns were obtained. The quantity of whiskers obtained was about 200 grams.

No attempt was made to use catalysts having a narrow range of sizes. In all cases, the catalyst particles ranged in size from about 1/200 microns to about 5 microns.

Although up to 5 atomic percent of catalyst can profitably be used in the manufacture of tungsten whiskers, it is preferable not to go above about 2 atomic percent. The reason is that at the higher concentrations of catalyst the whiskers produced tend to be shorter and to be angular.

Although only chlorides have been given as examples of catalysts, it is evident that any halide of the specified metals which is reducible by hydrogen in the specified temperature range could be used.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of producing tungsten whiskers comprising the steps of uniformly interdispersing tungsten oxide and at least one catalyst selected from the group consisting of Ni, Pd and Pt and their hydrogen-reducible halides, said tungsten oxide and catalyst being in fine granular form, the diameters of said catalyst particles ranging from about $1/200\mu$ to about $5\mu$ and the catalyst content ranging from about $1 \times 10^{-3}$ to about 5 atomic percent of the total, placing the resultant interdispersion in a hydrogen atmosphere, raising the temperature of said interdispersion to between about 950° and 1,100° C and holding said interdispersion within said temperature range for a period sufficient for the growth of whiskers.

2. A method as defined in claim 1, wherein said hydrogen in said hydrogen atmosphere is moved over said interdispersion at a rate of about 100 liters to about 1,000 liters per hour for a batch of tungsten oxide and catalyst weighing about 500 grams.

3. A method as defined in claim 1, wherein the temperature of said interdispersion is raised to about 1,000° C and hydrogen is passed over said interdispersion at a rate of about 300 liters per hour.

4. A method as defined in claim 1, wherein said interdispersion consists of 500 grams of tungsten oxide and 0.5 grams of $NiCl_2$.

5. A method as defined in claim 1, wherein said interdispersion consists of 500 grams of $WO_3$ and 0.5 grams of $PdCl_2$.

6. A method as defined in claim 1, wherein said interdispersion consists of 500 grams of $WO_3$ and 0.5 grams of Pt.

7. A method as defined in claim 1, wherein the diameters of said catalyst particles ranges from about $1/200\mu$ to about $5\mu$ and the catalyst content ranges from about $1 \times 10^{-3}$ to about 2 atomic percent of the total.

* * * * *